United States Patent
Suzuki et al.

[11] Patent Number: 5,848,208
[45] Date of Patent: Dec. 8, 1998

[54] OPTICAL-FIBER COUPLER AND MANUFACTURING PROCESS THEREFOR

[75] Inventors: Fumio Suzuki, Sanbu-gun; Hideki Sasaki, Sakura; Shigefumi Yamasaki, Sakura; Tomio Abiru, Sakura; Ryozo Yamauchi, Sakura, all of Japan

[73] Assignee: Fujikura Ltd., Tokyo, Japan

[21] Appl. No.: 893,145

[22] Filed: Jul. 15, 1997

[30] Foreign Application Priority Data

Jul. 25, 1996 [JP] Japan ................................. 8-196675

[51] Int. Cl.$^6$ ....................................................... G02B 6/26
[52] U.S. Cl. ................................................ 385/43; 385/42
[58] Field of Search ................................. 385/43, 46, 31, 385/9, 24, 45, 42, 51, 95, 96, 99, 27

[56] References Cited

U.S. PATENT DOCUMENTS

| | | | |
|---|---|---|---|
| 4,291,940 | 9/1981 | Kawasaki et al. | 385/43 |
| 4,400,055 | 8/1983 | Ozeki et al. | 385/43 |
| 5,195,151 | 3/1993 | Campbell, Jr. et al. | 385/43 |

*Primary Examiner*—Phan T. Palmer
*Attorney, Agent, or Firm*—Pearne, Gordon, McCoy & Granger LLP

[57] ABSTRACT

In an optical-fiber coupler formed by disposing two single-mode optical fibers 1 and 2 in parallel, and fusing and elongating the optical fibers at one position in the longitudinal extent of the optical fibers 1 and 2, variation of insertion loss dependent on the polarization can be eliminated in its manufacturing by imparting a twist to the optical coupling part 3' of the fused-elongated portion 3 so that with respect to the direction of a line on a plane orthogonally intersecting the longitudinal direction of the optical fibers 1 and 2, the line linking the centers of the two optical fibers 1 and 2, the direction of the line on a plane at one end of the optical coupling part 3' of the fused-elongated portion 3 makes an angle of 90 degrees with the direction of the line on a plane at the other end of the optical coupling part 3'.

4 Claims, 11 Drawing Sheets

PRIOR ART

PRIOR ART

PRIOR ART

OPTICAL-FIBER COUPLER AND MANUFACTURING PROCESS THEREFOR

BACKGROUND OF THE INVENTION

1. Field of the Invention

The present invention relates to a fused-elongated-type optical-fiber coupler formed by fusing and elongating single-mode optical fibers; in particular, the present invention relates to an optical-fiber coupler by which dependence on polarization can be improved, and relates to a process for manufacturing such an optical-fiber coupler.

2. Background Art

In the fields of optical communication, optical Instruments, optical-fiber sensors, and the like, fused-elongated-type optical-fiber couplers (hereinafter simply referred to as "optical-fiber couplers") formed by fusing and elongating single-mode optical fibers have been employed for the purpose of making optical signals which are transmitted in an optical fiber diverge or merge.

FIG. 11 is a perspective view showing an example of a conventional optical-fiber coupler. In the FIG., reference numerals 1 and 2 indicated optical fibers, reference numerals 1a and 2a indicate claddings, and reference numeral 3 indicates a fused-elongated portion. In addition, each of reference numerals P1, P2, P3, and P4 indicates a port.

An optical-fiber coupler of this type is usually manufactured in the following manned.

First, two single-mode optical fibers each of which is covered with a plastic coating are provided, and then, a part of the coating layer at a central portion of each of optical fibers 1 and 2 is removed so as to expose optical-fiber claddings 1a and 2a. Then, the two optical fibers 1 and 2 are placed in a manufacturing machine for an optical-fiber coupler in a manner such that the optical fibers 1 and 2 are arranged in parallel and that the exposed portions are next to each other. The manufacturing machine for an optical-fiber coupler employed in this process has a stage with a driving device for stretching the optical fibers 1 and 2 in the longitudinal direction. The two optical fibers are attached using an adhesive, strings, or the like, at the ends of each portion where the coating layer is removed, so as to maintain contact between the surfaces of the claddings 1a and 2a of the two optical-fibers at the portions where the coating layers are removed. In this condition, a central portion of the part where the claddings 1a and 2a are in contact with each other is heated using a gas burner or an electric heater so as to fuse the claddings 1a and 2a with each other. The heating is further continued, while the fused portion 3 of the two optical fibers is elongated by stretching the fused portion 3 in the longitudinal direction. The further the elongation proceeds in this manner, the higher the level of optical coupling at the fused-elongated portion 3. That is to say, when light enters through one of the two ports P1 or P2 which is at one end of the optical fiber 1 or 2, a certain percentage of the light enters into the other optical fiber due to the optical coupling at the fused-elongated portion 3, whereby both of the optical fibers 1 and 2 become capable of releasing lights through the ports P3 and P4, which are at the other ends of the optical fibers 1 and 2. Accordingly, the elongation is carried out while measuring the quantity of light released from each releasing end, and completed when a desired level of optical coupling is obtained. After the elongation, the fused-elongated portion 3 is housed in a protective case in order to ensure the environmental resistance, whereby an optical-fiber coupler is obtained.

An optical-fiber coupler manufactured by fusing and elongating two optical fibers in such a manner allows optical coupling at the fused-elongated portion 3; the optical coupling enabling divergence and mergence of light, which are the functions of the optical-fiber coupler.

However, in communication systems using lasers as light sources, it has recently become a problem that a level of optical coupling of an optical-fiber coupler depends on the state of polarization of the entering light. That is to say, there has been a problem in that when light enters through the port P1 at an entrance end, and is released from the port P3 or P4 at a releasing end, the insertion loss of the coupler varies depending on the polarization of the entering light. In particular, in a system where a plurality of optical-fiber couplers are used in many stages, the insertion loss variation dependent on the polarization accumulates, which may cause even larger problem. Such a variation of insertion loss dependent on the polarization is called "polarization-dependent loss" or "PDL".

With an optical-fiber coupler manufactured by a conventional process as described above, PDL has been inevitable for the following reasons.

FIG. 12 is a view of a cross section at line C—C through the optical coupling part of the fused-elongated portion 3 in the optical-fiber coupler shown in FIG. 11. The origin of the coordinate axes in this cross-sectional view is the center of the optical fiber 1, which is one of the two optical fibers 1 and 2 constituting the optical-fiber coupler; the z-axis extends in the longitudinal direction of the optical fiber 1; and on a plane vertical to the z-axis, the x-axis extends in the direction of the line linking the centers of the two optical fibers 1 and 2, and the y-axis extends in the direction perpendicular to the x-axis.

Now, suppose light of a certain polarized state enters the optical coupling part through the port P1. For example, FIG. 13 shows a situation where plane-polarized light which is polarized in the direction of the x-axis enters, while FIG. 14 shows a situation where plane-polarized light which is polarized in the direction of the y-axis enters. In these FIGS., the arrows indicate the directions of polarization of the entering light and the coupling light in the adjacent optical fiber which couples with the entering light. In the optical coupling part, the core-cladding structure is asymmetric; therefore, the degeneracy of the x-polarization mode and the y-polarization mode is lifted, and a difference in propagation constants arises; as a result, a difference in wavelengths at which the optical coupling becomes maximum/minimum arises, and PDL occurs. As a result, the coupling ratios of light released from the optical-fiber coupler vary depending on the polarization of the entering light, for example, depending on whether the entering light is polarized in the x direction or the y direction, as shown in FIG. 15. Accordingly, the coupler's insertion loss between the port P1 and the port P3 or between the port P1 and the port P4 varies depending on the polarization of the entering light, and PDL occurs.

Here, the coupling ratio, for example, when light enters through the port P1, the quantity of light released from the port P3 is p3, and the quantity of light released from the port P4 is p4, is given by the following formula:

$$\text{Coupling ratio } (\%) = \{p4/(p3+p4)\} \times 100$$

SUMMARY OF THE INVENTION

The object of the present invention is to provide an optical-fiber coupler formed by fusing and elongating single-mode optical fibers, with which variation of insertion loss dependent on the polarization (polarization-dependent loss; PDL) can be eliminated, and to provide a process for manufacturing such an optical-fiber coupler.

In order to achieve the above object, a first aspect of the present invention is an optical-fiber coupler formed by disposing two single-mode optical fibers in parallel, and fusing and elongating the optical fibers at one position in the longitudinal extent of the optical fibers so as to form a fused-elongated portion having an optical coupling part, the optical-fiber coupler being characterized in that with respect to the direction of a line on a plane orthogonally intersecting the longitudinal direction of the optical fibers, the line linking the centers of the two optical fibers, the direction of such a line on a plane at one end of the optical coupling part of the fused-elongated portion makes an angle in the range of 90±10 degrees with the direction of such a line on a plane at the other end of the optical coupling part.

Owing to the above constitution of the optical-fiber coupler according to the first aspect of the present invention, the PDL characteristics of a conventional optical-fiber coupler can be improved by a relatively simple technique in which with respect to the direction of a line on a plane orthogonally intersecting the longitudinal direction of the optical fibers, the line linking the centers of the two optical fibers, the direction of such a line on a plane at one end of the optical coupling part of the fused-elongated portion makes an angle in the range of 90±10 degrees with the direction of such a line on a plane at the other end of the optical coupling part. Moreover, since such an optical-fiber coupler does not have a complicated structure arid has a size nearly the same as that of a conventional type, the optical-fiber coupler is preferable in view of cost and compactness.

A second aspect of the present invention is a process for manufacturing an optical-fiber coupler by disposing two single-mode optical fibers in parallel, and heating to fuse and elongate the optical fibers at one position in the longitudinal extent of the optical fibers so as to form a fused-elongated portion having an optical coupling part, the process being characterized by comprising the step of giving a twist of the optical fibers at the optical coupling part of the fused-elongated portion in the course of the heating step.

Owing to the above constitution of the process for manufacturing an optical-fiber coupler according to the second aspect of the present invention, the PDL of an optical-fiber coupler can be improved simply by imparting a twist to the fused-elongated portion in the course of the fusing-elongating step. Accordingly, the operations are simple, and furthermore, since the manufacturing machine to be employed is merely required to be provided with a mechanism for twisting the fuse-elongated portion in addition to a conventional manufacturing machine for an optical-fiber coupler, the manufacturing machine can also be readily introduced into an existing production line at a low cost. Moreover, since the production time is almost the same as that of a conventional process, the process of the second aspect is useful in view of efficiency.

In addition, since the twist is added in the course of the fusing-elongating step, the thus-twisted part is additionally heated after the formation of the twist. Accordingly, distortion due to twisting can be eliminated, and an optical-fiber coupler having excellent optical characteristics and mechanical reliability can be obtained.

A third aspect of the present invention is a process for manufacturing an optical-fiber coupler by disposing two single-mode optical fibers in parallel, and heating to fuse and elongate the optical fibers at one position in the longitudinal extent of the optical fibers so as to form a fused-elongated portion, the process being characterized by comprising the step of imparting a twist to the optical fibers before the heating step.

Owing to the above constitution of the process for manufacturing an optical-fiber coupler according to the third aspect of the present invention, the PDL of an optical-fiber coupler can be improved simply by imparting a twist to the two optical fibers before the fusing-elongating step. Accordingly, the operations are simple, and furthermore, since the manufacturing machine to be employed is merely required to be provided with a mechanism for twisting the fuse-elongated portion in addition to a conventional manufacturing machine for an optical-fiber coupler, the manufacturing machine can also be readily introduced into an existing production line at a low cost. Moreover, since the production time is almost the same as that of a conventional process, the process of the third aspect is useful in view of efficiency.

In addition, since the twist is added before the fusing-elongating step, the thus-twisted part is heated after the formation of the twist. Accordingly, distortion due to twisting can be eliminated, and an optical-fiber coupler having excellent optical characteristics and mechanical reliability can be obtained.

A fourth aspect of the present invention is a process for manufacturing an optical-fiber coupler by disposing two single-mode optical fibers in parallel, and heating to fuse and elongate the optical fibers at one position in the longitudinal extent of the optical fibers so as to form a fused-elongated portion having an optical coupling part, the process being characterized by comprising the steps of cutting the optical coupling part of the fused-elongated portion into two sections in the course of the heating step, rotating one section around a central axis perpendicular to the cutting plane, joining the two sections together at the cutting plane, and further heating to fuse and elongate the fused-elongated portion.

Owing to the above constitution of the process for manufacturing an optical-fiber coupler according to the fourth aspect of the present invention, the PDL of an optical-fiber coupler can be improved simply by cutting the optical coupling part of the fused-elongated portion into two sections, rotating one section around a central axis perpendicular to the cutting plane, and joining the two sections together at the cutting plane, in the course of the fusing-elongating step. Accordingly, the operations are simple, and furthermore, since the manufacturing machine to be employed is merely required to be provided with a cutting means and a mechanism for rotating the optical fibers in addition to a conventional manufacturing machine for an optical-fiber coupler, the manufacturing machine can also be readily introduced into an existing production line at a low cost. In addition, since the cutting and joining steps are carried out in the course of the fusing-elongating step, the thus-joined part is additionally heated after the joining step. Accordingly, a stepped structure due to the joining can be eliminated, and an optical-fiber coupler having excellent optical characteristics and mechanical reliability can be obtained.

DESCRIPTION OF THE PREFERRED EMBODIMENTS

Figure 1:
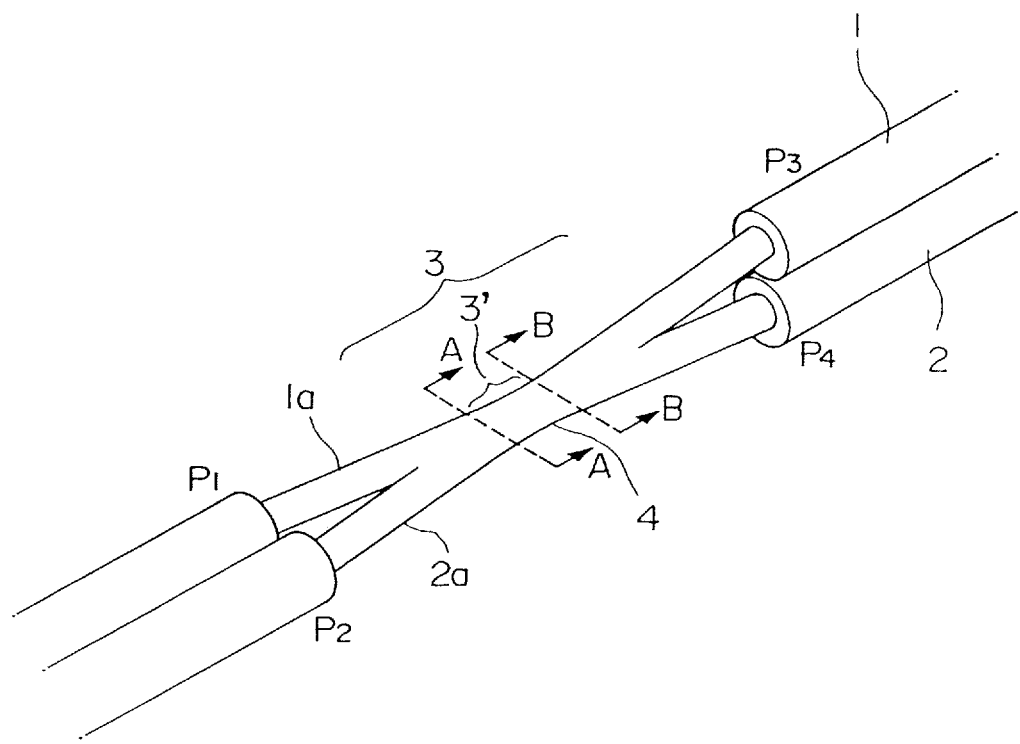
FIG. 1 is a perspective view showing an embodiment of an optical-fiber coupler according to the present invention.

The present invention will be further described in detail below. FIG. 1 is a perspective view showing an embodiment of an optical-fiber coupler according to the present invention.

In this embodiment, the optical-fiber coupler is formed by disposing two single-mode optical fibers 1 and 2 in parallel, and fusing and elongating the optical fibers at one position in the longitudinal extent of the optical fibers; the optical fiber coupler greatly differing from conventional type in that a twist is provided in the optical coupling part 3' of the fused-elongated portion 3 (to form a twisted part 4) so that with respect to the direction of a line on a plane orthogonal to the longitudinal direction of the optical fibers 1 and 2, and linking the centers of the two optical fibers 1 and 2, the direction of such a line on the plane at one end of the optical coupling part 3' of the fused-elongated portion 3 makes an angle of approximately 90 degrees with the direction of the line on the plane at the other end of the optical coupling part 3'.

Figure 2A:
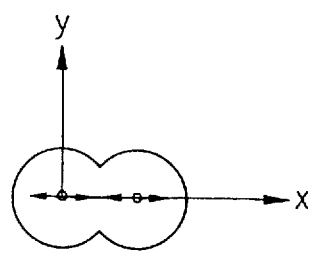
FIG. 2A is a view of the, cross section at line A—A of the optical-fiber coupler shown in FIG. 1, into which light of x polarization is introduced.
Figure 2B:
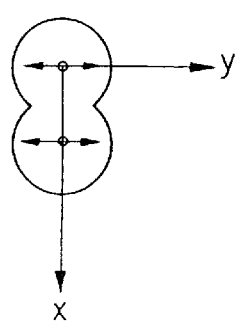
FIG. 2B is a view of the cross section at line B—B of the optical-fiber coupler shown in FIG. 1, into which light of x polarization is introduced.
Figure 3A:
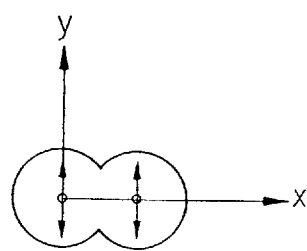
FIG. 3A is a view of the cross section at line A—A of the optical-fiber coupler shown in FIG. 1, into which light of y polarization is introduced.
Figure 3B:
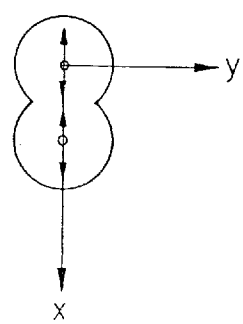
FIG. 3B is a view of the cross section at line B—B of the optical-fiber coupler shown in FIG. 1, into which light of y polarization is introduced.
Figure 12:
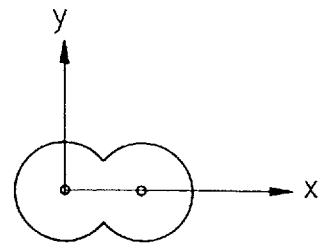
FIG. 12 is a view of the cross section at line C—C of FIG. 11.
Figure 13:
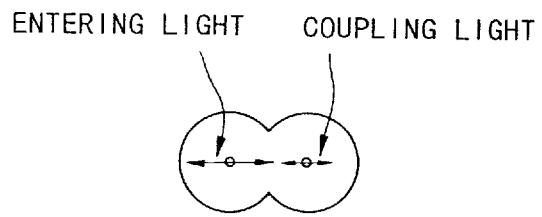
FIG. 13 is a view of the cross section at line C—C of the conventional optical-fiber coupler as shown in FIG. 11, into which light of x polarization is introduced.
Figure 14:
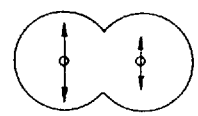
FIG. 14 is a view of the cross section at line C—C of the conventional optical-fiber coupler as shown in FIG. 11, into which light of y polarization is introduced.
Figure 15:
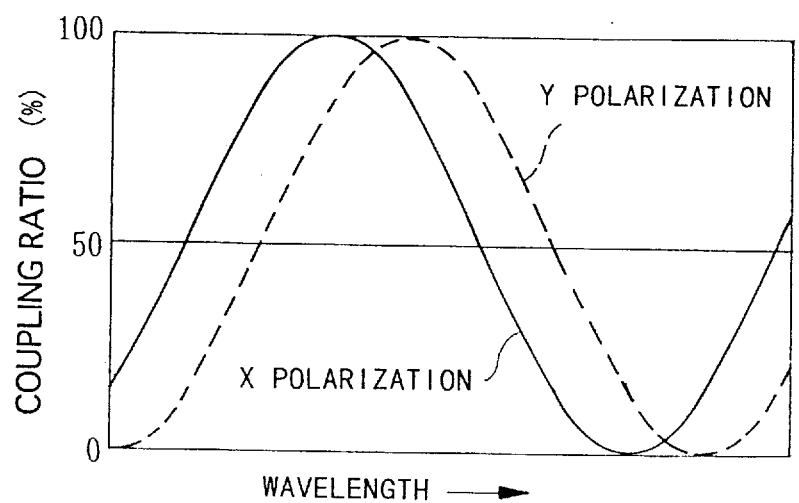
FIG. 15 is a graph showing the wavelength-coupling ratio characteristics of light of x and y polarization using a conventional optical-fiber coupler.

FIGS. 2 and 3 show views of the cross sections at upstream and downstream ends of the optical coupling part 3' in the fused-elongated portion 3 of the optical-fiber coupler shown in FIG. 1. FIGS. 2A and 3A are views of cross sections at line A—A of FIG. 1. FIGS. 2B and 3B are views of cross sections at line B—B of FIG. 1. The coordinate axes are the same as those in FIG. 12.

Suppose light of a certain polarization enters the twisted part 4 through the port P1 at an entrance end. For example, FIGS. 2A and 2B show a situation where plane-polarized light polarized in the direction of the x-axis enters. The x polarization of light at the upstream end of the twisted part 4 as shown in FIG. 2A changes into y polarization at the downstream end of the twisted part 4 as shown in FIG. 2B. On the other hand, FIGS. 3A and 3B show a situation where plane-polarized light polarized in the direction of the y-axis enters. The y polarization of light at the upstream end of the twisted part 4 as shown in FIG. 3A changes into x polarization at the downstream end of the twisted part 4 as shown in FIG. 3B.

Thus, since in the optical-fiber coupler of this embodiment, the optical fibers 1 and 2 are both twisted by approximately 90 degrees at the twisted part 4, light entering with x polarization changes into light of y polarization, and light entering with y polarization changes into light of x polarization, after the light passes through the twisted part 4. Accordingly, light entering with x polarization as well as light entering with y polarization experiences coupling in the optical coupling part 3' under x-polarization and y-polarization at the same levels; as a result, the variation of the polarization-dependent loss (PDL) can be reduced to an extremely low level.

Theoretically, 100% of light which is x polarized (or y polarized) upon entering can be changed into light of y polarization (or x polarization) by using an optical-fiber coupler formed by twisting both optical fibers 1 and 2 by 90 degrees at the optical coupling part 3', whereby PDL. can be completely eliminated. Accordingly, since the vector expressing the polarization state of entering light can be expressed as the sum of vectors of x and y polarization, it is assumed that the variation in the insertion loss dependent on the polarization of entering light (PDL) can be reduced to almost zero.

It is noted that although a twist of approximately 90 degrees is given to the optical coupling part 3' according to this embodiment, the optical fibers 1 and 2 may be twisted several times so that the direction of a line linking the centers of optical fibers 1 and 2 at the upstream end of the optical coupling part 3' makes an angle of approximately 90 degrees with that at the downstream end. That is to say, the optical coupling part 3' may be formed by twisting the optical fibers 1 and 2 by (2n+1)×90 degrees (wherein n is an integer).

In addition, although it is preferable that a twist have an angles of exactly (2n+1)×90 degrees, a sufficient PDL reduction effect can be obtained when the angle of the twist is in the range of (2n+1)×90±10 degrees.

According to this embodiment, PDL characteristics of a conventional optical-fiber coupler formed by disposing two optical fibers 1 and 2 in parallel, and fusing and elongating the optical fibers at one position in the longitudinal extent of the optical fibers can be improved simply by giving a twist of 90 degrees to the optical coupling part 3' in the fused-elongated portion 3 of the optical-fiber coupler. Accordingly, since such an optical-fiber coupler does not have a complicated structure and has a size nearly the same as that of a conventional type, a conventional protective case or other related parts may be applied to this optical-fiber coupler without modification, and thus the optical-fiber coupler is preferable in view of cost and compactness.

Moreover, since the twisted part 4 in which the optical fibers 1 and 2 are twisted together is in the fused-elongated portion 3, stress due to the twist does not remain, and degradation of optical properties and reliability is rarely observed.

Figure 16A:
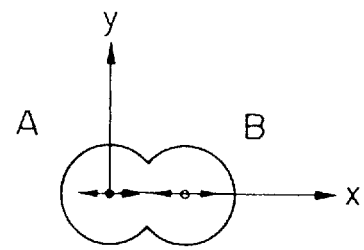
FIGS. 16A, 16B, and 16C are cross-sectional views of an optical coupling part which is twisted by 180 degrees, into which light of x polarization is introduced.
Figure 16B:
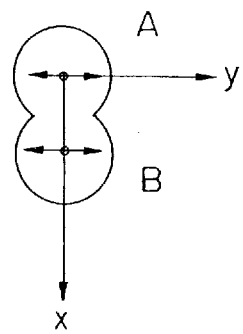
Figure 16C:
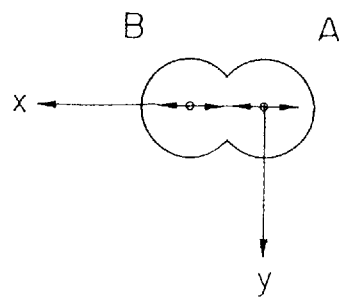

In the case where the angle of the twist at the twisted part 4 is an even-numbered multiple of 90 degrees (2n×90 degrees), optical coupling of one of the polarization states, the x or y polarization, becomes dominant, and therefore the effect of improving PDL cannot be obtained. FIGS. 16A, 16B, and 16C shows a situation where the optical coupling part of an optical-fiber coupler is twisted by 180 degrees; wherein FIG. 16A is a cross-sectional view showing the upstream end of the optical coupling part; FIG. 16B is a cross-sectional view showing the middle of the optical coupling part; and FIG. 16C is a cross-sectional view showing the downstream end of the optical coupling part. In these cross-sectional views, the coordinate axes are the same as those in FIG. 12. In addition, when plane-polarized light which is polarized in the direction of x axis enters, light which is x-polarized at the upstream end of the coupling part once becomes y-polarized at the middle of the optical coupling part, and then returns to the x-polarization state at the downstream end of the coupling part. Thus, in the case where the optical coupling part is twisted by approximately 180 degrees, since light entering with x polarization experiences the x-polarization state more than the y polarization state, while the light passes through the optical coupling part, the x polarization is dominant, and an effect of reducing the variation of the polarization-dependent loss (PDL) can be obtained.

An optical-fiber coupler of this embodiment can be manufactured, for example, in the following manner.

A first embodiment of a manufacturing process for an optical-fiber coupler according to the present invention will be explained in the following.

First, two single-mode optical fibers 1 and 2 each of which is covered with a plastic coating are provided, and then, a part of the coating layer at a central portion of each of optical fibers 1 and 2, preferably in the length of about 30 mm, is removed so as to expose optical-fiber claddings 1a and 2a.

Next, the two optical fibers 1 and 2 are placed in the manufacturing machine for an optical-fiber coupler in a manner such that the optical fibers 1 and 2 are arranged in parallel and that the exposed portions are next to each other. The manufacturing machine for an optical-fiber coupler employed in this process has a stage with a driving device for stretching the optical fibers 1 and 2 in the longitudinal direction, and is preferably constructed so as to hold the ends of the exposed portions with clamps which are fixed to the stage.

Then, the claddings 1a and 2a of the two optical fibers are attached to each other using an adhesive, strings, or the like, at the ends of each portion where the coating layer is removed, so as to maintain contact between the surfaces of the claddings 1a and 2a of the two optical-fibers at the portions where the coating layers are removed.

In this condition, the part where the claddings 1a and 2a are in contact with each other (preferably the central portions thereof) is heated so as to fuse the claddings 1a and 2a with each other; then, the heating is further continued, while the fused portion 3 is elongated by stretching the fused portion 3 in the longitudinal direction. For this heating, a gas burner or an electric heater should preferably be used as a heat source.

Then, by rotating one of the clamps holding the ends of the two optical fibers 1 and 2 by approximately 90 degrees with respect to the other clamp in the course of the fusing-elongating step, a twist of 90 degrees is given to the optical coupling part 3' of the fused-elongated portion 3.

In addition, the fusing-elongating step is carried out While measuring the quantity of light released from each releasing end, and completed when a desired level of optical coupling is achieved. After this step, the fused-elongated portion 3 is housed in a protective case in order to ensure environmental resistance, whereby an optical-fiber coupler is obtained.

According to the manufacturing process of an optical-fiber coupler in this embodiment, the PDL of an optical-fiber coupler can be reduced simply by giving a twist to the optical coupling part 3' of the fused-elongated portion 3 in the course of the fusing-elongating step. Accordingly, the operations are simple, and furthermore, since the manufacturing machine to be employed is merely required to be provided with a mechanism for rotating one of the clamps in addition to a conventional manufacturing machine for an optical-fiber coupler, the manufacturing machine can also be readily introduced into an existing production line at a low cost. Moreover, since the production time is almost the same as that of a conventional process, the process of the first embodiment is useful in view of efficiency.

In addition, since the twist is added in the course of the fusing-elongating step, the thus-twisted part 4 is additionally heated after the formation of the twist. Accordingly, distortion due to twisting can be eliminated, and an optical-fiber coupler having excellent optical characteristics and mechanical reliability can be obtained.

Although a twist is given to the fused-elongated portion 3 in the course of the fusing-elongating step, the fusing-elongating step may be carried out after the optical fibers 1 and 2 are twisted.

A second embodiment of a manufacturing process for an optical-fiber coupler according to the present invention will be explained in the following.

First, in a manner similar to the above first embodiment, two single-mode optical fibers 1 and 2 each of which is covered with a plastic coating are provided, and then, a part of the coating layer at a central portion of each of the optical fibers 1 and 2 is removed so as to expose optical-fiber claddings 1a and 2a.

Next, the two optical fibers 1 and 2 are placed in a manufacturing machine for an optical-fiber coupler in a manner such that the optical fibers 1 and 2 are arranged in parallel and that the exposed portions are next to each other. As the manufacturing machine for an optical-fiber coupler, one similar to that used in the above first embodiment is preferably used.

Then, by rotating one of the clamps holding the ends of the two optical fibers 1 and 2 for several turns with respect to the other clamp, the surfaces of the claddings 1a and 2a of the two optical fibers 1 and 2 are brought into contact with each other. Thereafter, in order that the portion where the optical fibers 1 and 2 are twisted together will form an optical coupling part having a twist of 90 degrees after fusing and elongating, the pitch and the position of the twist are adjusted using a tool having a smooth surface, such as a plastic stick, which will not damage the surfaces of the claddings of the optical fibers.

Subsequently, by heating a portion of the twisted part formed as above, the claddings 1a and 2a are fused together at this portion; then, while continuing heating, the fused portion 3 is elongated by stretching the portion in the longitudinal direction. For this heating, a gas burner or an electric heater should preferably be used as a heat source.

In addition, the fusing-elongating step is carried out while measuring the quantity of light released from each releasing end, and the elongation is completed when a desired level of optical coupling is achieved. After this step, the fused-elongated portion 3 is housed in a protective case in order to ensure environmental resistance, whereby an optical-fiber coupler is obtained.

According to the manufacturing process of an optical-fiber coupler in this embodiment, the PDL of the optical-fiber coupler can be reduced simply by giving a twist to the two optical fibers 1 and 2 before the fusing-elongating step. Accordingly, the operations are simple, and furthermore, since the manufacturing machine to be employed is merely required to be provided with a mechanism for rotating one of the clamps in addition to a conventional manufacturing machine for an optical-fiber coupler, the manufacturing machine can also be readily introduced into an existing production line at a low cost. Moreover, since the production time is almost the same as that of a conventional process, the process of the second embodiment is useful in view of efficiency.

In addition, since the twist is added before the fusing-elongating step, the thus-twisted part 4 is heated after the formation of the twist. Accordingly, distortion due to twisting can be eliminated, and an optical-fiber coupler having excellent optical characteristics and mechanical reliability can be obtained.

An optical-fiber coupler as shown in FIG. 1 can also be manufactured as follows.

A third embodiment of a manufacturing process for an optical-fiber coupler according to the present invention will be explained in the following.

Figure 4A:
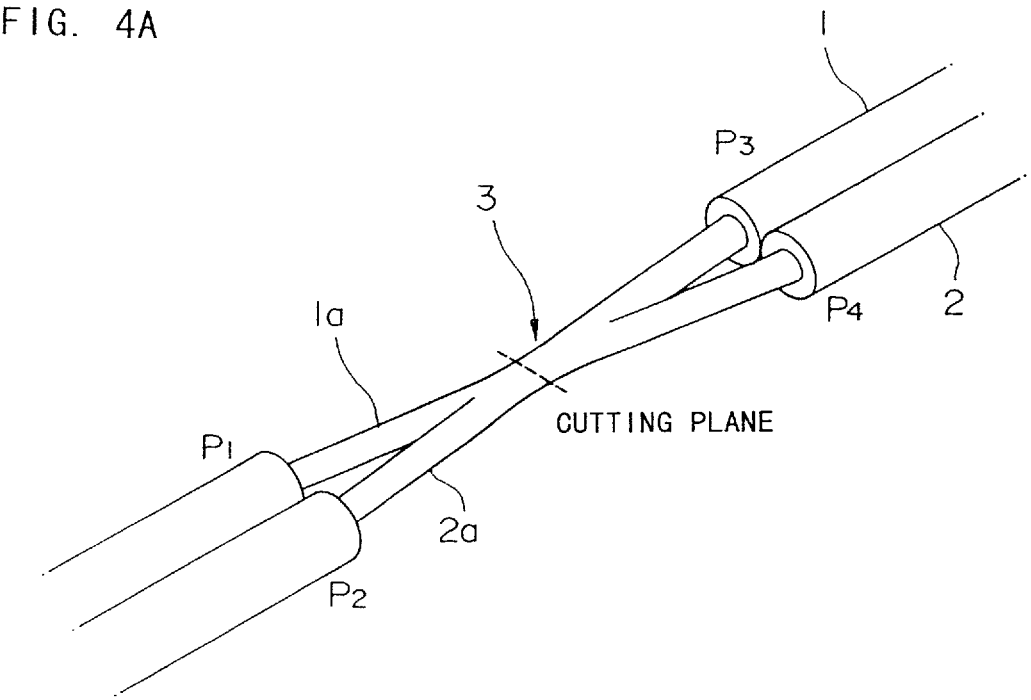
FIGS. 4A and 4B are perspective views sequentially showing the steps of a third embodiment of a manufacturing process of an optical-fiber coupler according to the present invention.
Figure 4B:
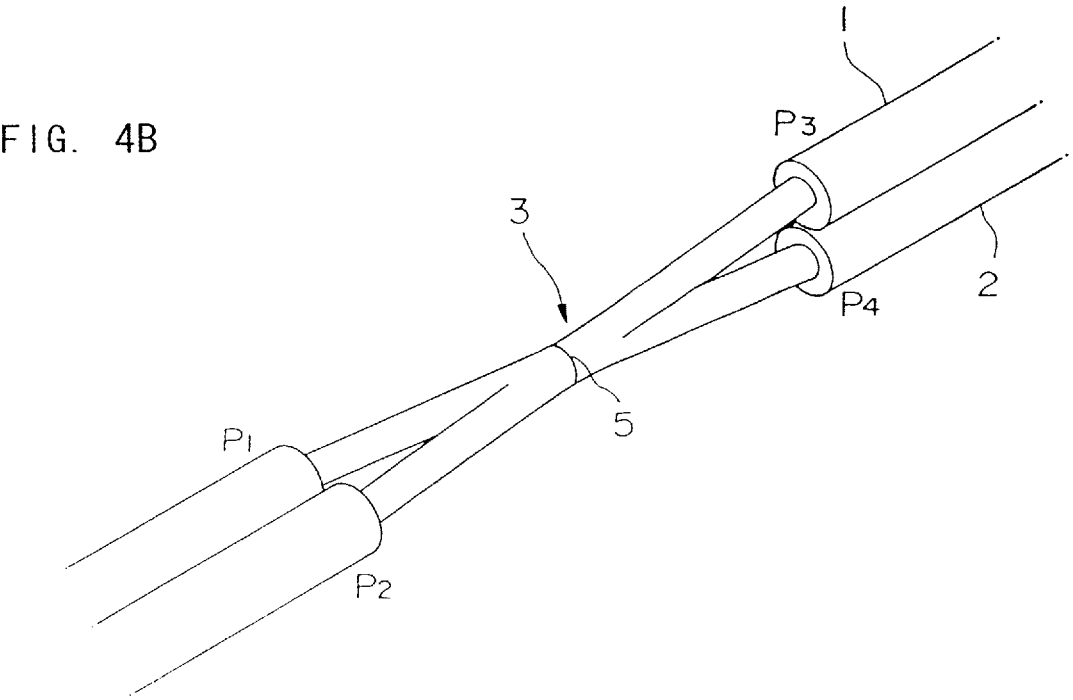

FIGS. 4A and 4B sequentially show the steps of a manufacturing process of an optical-fiber coupler according to this embodiment.

First, in a manner similar to the above first embodiment, two single-mode optical fibers 1 and 2 each of which is covered with a plastic coating are provided, and then, a part of the coating layer at a central portion of each of optical fibers 1 and 2 is removed so as to expose optical-fiber claddings 1a and 2a.

Next, the two optical fibers 1 and 2 are placed in a manufacturing machine for an optical-fiber coupler in a manner such that the optical fibers 1 and 2 are arranged in parallel and the exposed portions are next to each other. As the manufacturing machine for an optical-fiber coupler, one similar to that used in the above first embodiment is preferably used.

Then, the claddings 1a and 2a of the two optical fibers are attached to each other using an adhesive, strings, or the like, at the ends of each portion where the coating layer is removed, so as to maintain contact between the surfaces of the claddings 1a and 2a of the two optical-fibers at the portions where the coating layers are removed.

In this condition, the part where the claddings 1a and 2a are in contact with each other (preferably the central portions thereof) is heated so as to fuse the claddings 1a and 2a with each other; then, the heating is further continued, while the fused portion 3 is elongated by stretching the fused portion 3 in the longitudinal direction. For this heating, a gas burner or an electric heater should preferably be used as a heat source.

Then, as shown in FIG. 4A, in the course of this fusing-elongating step, preferably when optical coupling is created, the fused-elongated portion 3 is cut into two sections at the central position thereof.

Subsequently, one section is rotated by 90 degrees around a central axis perpendicular to the cutting plane as shown in FIG. 4B (for example, by rotating one of the clamps holding the ends of the two optical fibers 1 and 2 by 90 degrees with respect to the other clamp); thereafter, the two sections are joined together at the cutting plane (joined part 5); and the heating for fusing and elongating is further carried out.

In addition, the fusing-elongating step is carried out while measuring the quantity of light released from each releasing end, and the elongation is completed when a desired level of optical coupling is achieved. After this step, the fused-elongated portion 3 is housed in a protective case in order to ensure environmental resistance, whereby an optical-fiber coupler is obtained.

According to the manufacturing process of an optical-fiber coupler in this embodiment, the PDL of an optical-fiber coupler can be reduced simply by cutting the fused-elongated portion 3 into two sections, rotating one section, and joining the two sections together, in the course of the fusing-elongating step. Accordingly, the operations are simple, and furthermore, since the manufacturing machine to be employed is merely required to be provided with a cutting means and a mechanism for rotating one of the clamps in addition to a conventional manufacturing machine for an optical-fiber coupler, the manufacturing machine can also be readily introduced into an existing production line at a low cost.

In addition, since the cutting and joining steps are carried out in the course of the fusing-elongating step, the thus-joined part 5 is additionally heated after the joining step. Accordingly, a stepped structure due to the joining can be eliminated, and an optical-fiber coupler having excellent optical characteristics and mechanical reliability can be obtained.

A process as in this embodiment, in which a twisted part 4 is formed by cutting the fused-elongated portion, can reduce PDL more greatly than a process in which the fused-elongated portion is simply twisted.

Moreover, the above first to third embodiments describe manufacturing processes for an optical-fiber coupler having a structure in which the direction of a line which links the centers of the two optical fibers 1 and 2 at one end of the optical-fiber coupler covered with a coating layer makes an angle of approximately 90 degrees with the direction of a line at the other end; however, an optical-fiber coupler of the present invention will function as long as the direction of a line which links the centers of the two optical fibers 1 and 2 at one end of the optical coupling part, makes an angle of approximately 90 degrees with the direction of a line at the other end of the optical coupling part; therefore, the optical-fiber coupler may be of a structure in which the direction of a line which links the centers of the two optical fibers 1 and 2 at one end of the optical-fiber coupler covered with a coating layer is identical to the direction of a line at the other end. Such an optical-fiber coupler can be manufactured in the following manner.

A fourth embodiment of a manufacturing process for an optical-fiber coupler according to the present invention will be explained in the following.

Figure 5A:
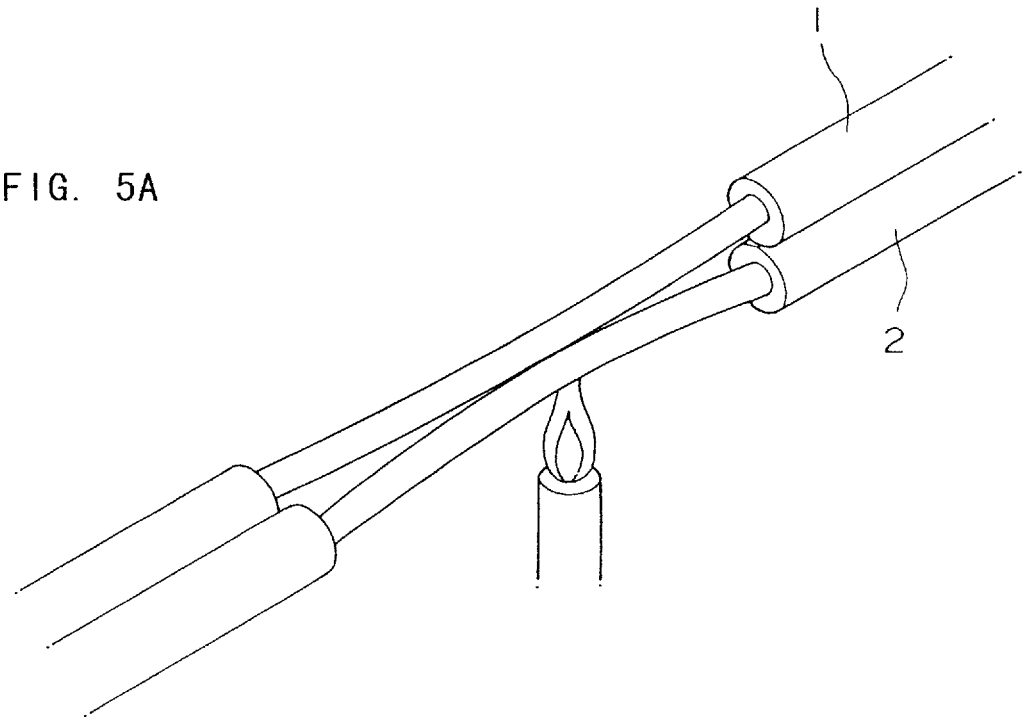
FIGS. 5A and 5B are perspective views sequentially showing the steps of a fourth embodiment of a manufacturing process of an optical-fiber coupler according to the present invention.
Figure 5B:
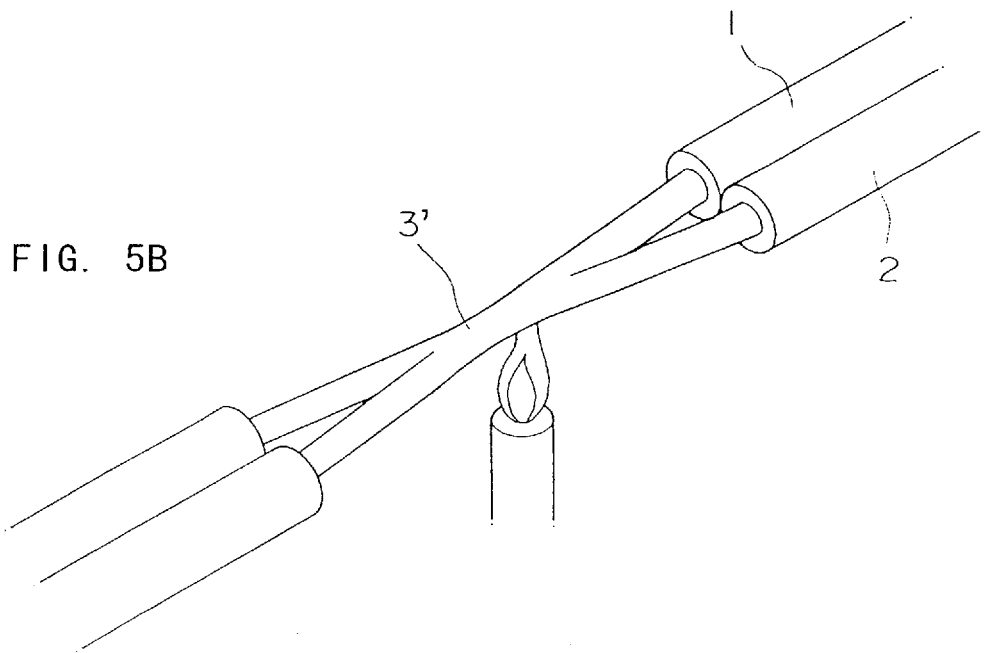

FIGS. 5A and 5B sequentially show the steps of a manufacturing process of an optical-fiber coupler according to this embodiment.

First, in a manner similar to the above first embodiment, two single-mode optical fibers 1 and 2 each of which is covered with a plastic coating are provided, and then, a part of the coating layer at a central portion of each of the optical fibers 1 and 2 is removed so as to expose optical-fiber claddings 1a and 2a.

Next, the two optical fibers 1 and 2 are placed in a manufacturing machine for an optical-fiber coupler in a manner such that the optical fibers 1 and 2 are arranged in parallel and that the exposed portions are next to each other. As the manufacturing machine for an optical-fiber coupler, one similar to that used in the above first embodiment is preferably used.

Then, by rotating one of the clamps holding the ends of the two optical fibers 1 and 2 by approximately 90 degrees with respect to the other clamp, the surfaces of the claddings 1a and 2a of the two optical fibers 1 and 2 are brought into contact with each other.

Subsequently, by heating a portion of the part where the optical fibers 1 and 2 are in contact with each other, the claddings 1a and 2a are fused together at this portion; then, while continuing heating, the fused portion 3 is elongated by stretching the portion in the longitudinal direction. For this heating, a gas burner or an electric heater should preferably be used as a heat source.

This fusing-elongating step is carried out while measuring the quantity of light released from each releasing end, and when a desired level of optical coupling is neared, one of the clamps holding the ends of the two optical fibers 1 and 2 is rotated by approximately 90 degrees with respect to the other clamp, as shown in FIG. 5B. This rotation is carried out so as to give a twist of approximately 90 degrees to the optical coupling part 3', and also to bring the direction of a line which links the centers of the two optical fibers 1 and 2 at one end of the optical-fiber coupler covered with a coating layer into agreement with the direction of a line at the other end. The direction of this rotation of clamps may be the same as or opposite to the direction of the rotation by approximately 90 degrees which was carried out before the fusing-elongating step.

Figure 6:
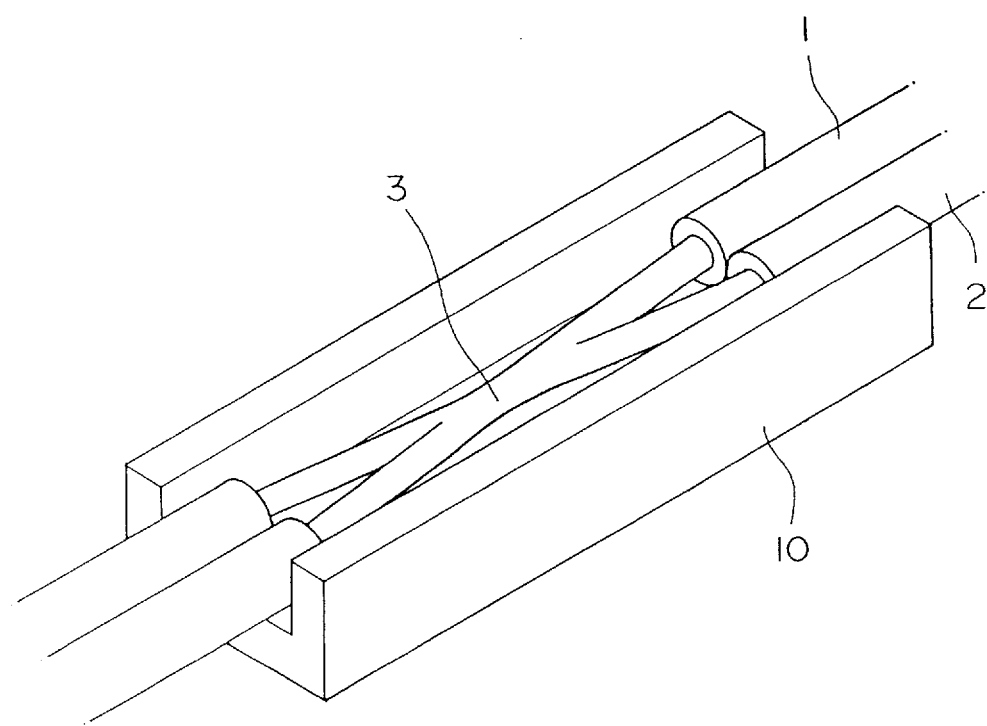
FIG. 6 is a perspective view showing an optical-fiber coupler obtained by the fourth embodiment of the present invention.

When the desired optical coupling characteristics are obtained, the elongation is completed, and the fused-elongated portion 3 is housed in a protective case 10 as shown in FIG. 6 in order to ensure environmental resistance, whereby an optical-fiber coupler is obtained.

According to a manufacturing process for an optical-fiber coupler of the this embodiment, no twist is provided in the optical coupling part when the two optical fibers 1 and 2 are twisted together by approximately 90 degrees and the fusing-elongating step is carried out; thereafter, by twisting the two optical fibers 1 and 2 together so as to bring the direction of a line which links the centers of the two optical fibers 1 and 2 at one end of the optical-fiber coupler into agreement with the direction of a line at the other end, a twist of approximately 90 degrees is given to the optical coupling part, and an optical-fiber coupler of a low PDL can be obtained.

Since an optical-fiber coupler having such a structure possesses identical shapes at both ends of the optical-fiber coupler, it can be conveniently housed in a protective case which has a groove having an even width along the longitudinal direction; accordingly, such an optical-fiber coupler is preferable since it can fit a conventional protective case. Furthermore, since the manufacturing machine to be employed is merely required to be provided with a mechanism for rotating one of the clamps in addition to a conventional manufacturing machine for an optical-fiber coupler, the manufacturing machine can also be readily introduced into an existing production line at a low cost. Moreover, since the production time is almost the same as that of a conventional process, the process of this embodiment is also useful in view of efficiency.

EXAMPLES

Example 1

In line with the manufacturing process of the above first embodiment, a WDM (wavelength-division-multiplexing) optical-fiber coupler for 1.48/1.55 $\mu$m was manufactured, which capable of diverging and merging light having a wavelength of 1.48 $\mu$m and light having a wavelength of 1.55 $\mu$m.

That is to say, first, two single-mode optical fibers were provided. For each of the single-mode optical fibers, one having a mode field diameter of 9.5 $\mu$m, a cladding diameter of 125.5 $\mu$m, a coating diameter of 255 $\mu$m, and a cut-off wavelength of 1.23 $\mu$m was used.

Next, a part of the coating layer of each of optical fibers was removed in a length of about 30 mm, and thereafter the optical fibers were placed in a manufacturing machine for an optical-fiber coupler, and the exposed claddings were brought into contact with each other.

Subsequently, the exposed cladding portions were heated at the approximate centers thereof, and were elongated while the heating was further continued. During this elongating step, light having a wavelength of 1.48 $\mu$m and light having a wavelength of 1.55 $\mu$m were introduced through P1, which was one of the ports at the entrance end, and the quantities of light released from P3 and P4, the two ports at the releasing end, were monitored; an optical coupling state in which 100% of coupling light having the wavelength of 1.55 $\mu$m is obtained from P3, which is one of the ports at the releasing end, and 100% of coupling light having the wavelength of 1.48 $\mu$m is obtained from the other port P4 was targeted. Then, when the optical coupling level of the light having the wavelength of 1.48 $\mu$m reached approximately 100% one of the clamps holding the ends of the two optical fibers was rotated approximately 90 degrees with respect to the other clamp thereby giving a twist of 90 degrees to the fused-elongated portion. Thereafter, the elongating was further continued until the targeted optical coupling state was achieved. The final elongation length was 35 mm.

The PDL characteristics of the thus-obtained optical-fiber coupler were evaluated.

Figure 7:
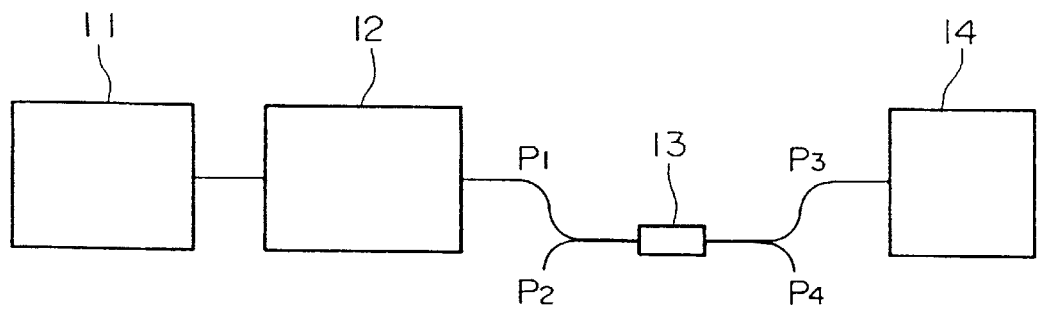
FIG. 7 is a schematic compositional view showing a measuring system for measuring the PDL, of an optical-fiber coupler.

FIG. 7 shows a measuring system for measuring the PDL of an optical-fiber coupler. This measuring system is composed of a wavelength-variable laser diode light source 11, polarization controller 12, an optical-fiber coupler 13, and an optical power meter 14. After light from the power source 11 is adjusted to a predetermined polarization using the polarization controller 14, the light is introduced into the port P1 of the optical-fiber coupler 13, and the quantity of the transmitted light which is released from the port P3 is measured by the optical power meter 14. Then, the PDL is obtained by finding the ratio of the minimum value to the maximum value of the transmitted light quantity obtained by varying the polarization of light introduced in the optical-fiber coupler 13.

Figure 8:
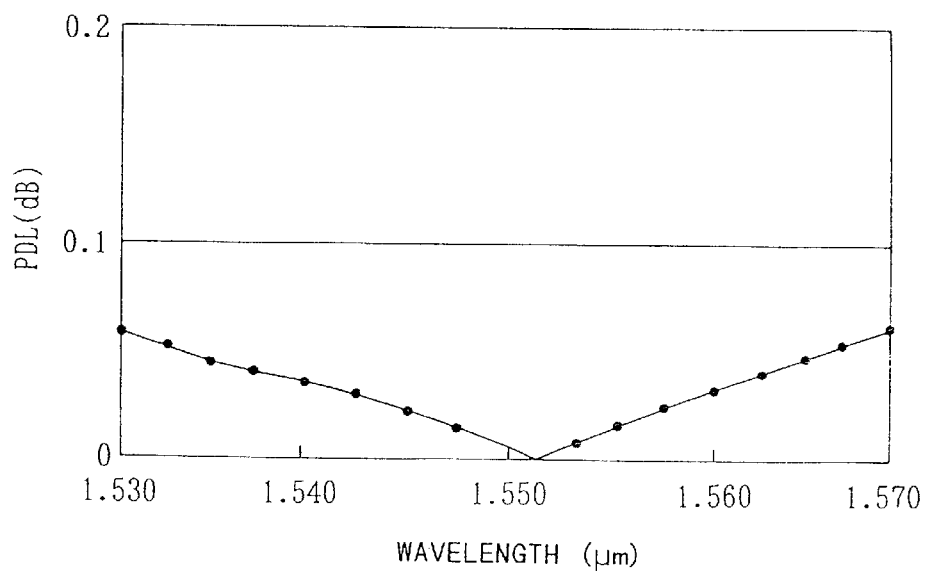
FIG. 8 is graph showing the PDL characteristics of an optical-fiber obtained in accordance with an example of the present invention.

FIG. 8 shows the PDL characteristics of an optical-fiber coupler obtained in accordance with this example. As shown in the figure, the maximum value of the PDL in the wavelength range of 1.55±0.001 µm was 0.03 dB, which was extremely low. The reason why the PDL of the optical-fiber coupler did not absolutely become zero in this example is believed to be due to the 90 degree twist at the fused-elongated portion not being fully imparted to the optical coupling part. Accordingly, in order to accomplish a lower PDL, the twist between the clamps may be adjusted to be more than 90 degrees, so as to give a twist of exactly 90 degrees to the optical coupling part, taking account of the amount of twist imparted to parts other than the optical coupling part.

Furthermore, in order to efficiently manufacture an optical fiber coupler of a lower PDL, it is preferable that the relationship between the amount of twist of the clamps and the PDL be known, prior to manufacturing of the optical-fiber coupler.

Example 2

In line with the manufacturing process of the above second embodiment, a WDM (wavelength-division-multiplexing) optical-fiber coupler for 1.48/1.55 µm was manufactured.

That is to say, in a manner similar to the above Example 1, first, two single-mode optical fibers were provided, and a part of the coating layer of each of the optical fibers was removed, then the optical fibers were placed in a manufacturing machine for an optical-fiber coupler, and the exposed claddings were brought into contact with each other.

Subsequently, one of the clamps holding the ends of the two optical fibers was rotated by 270 degrees with respect to the other clamp. Furthermore, the twist was adjusted using a plastic stick Having a diameter of 1.5 mm with a smooth surface so as to obtain a pitch of approximately 8 mm and to position the twist at the center of the fused-elongated portion.

After the above procedure, the central portion of the twisted part was heated over a length of approximately 6 mm so as to fuse the claddings with each other. Then, while monitoring the quantities of the released light, elongation was carried out until the targeted optical coupling state was achieved. The final elongation length was 35 mm.

The results of measurement of PDL characteristics of the thus-obtained optical-fiber coupler were found to be similar to those of Example 1, that is, the maximum value of the PDL in the wavelength range of 1.55±0.001 µm according to Example 2 was 0.03 dB, which was extremely low.

Example 3

In line with the manufacturing process of the above third embodiment, a WDM (wavelength-division-multiplexing) optical-fiber coupler for 1.48/1.55 µm was manufactured.

That is to say, in a manner similar to the above Example 1, first, two single-mode optical fibers were provided, and a part of the coating layer of each of optical fibers was removed, then the optical fibers were placed in a manufacturing machine for an optical-fiber coupler, and the exposed cladding were brought into contact with each other.

Subsequently, the approximate centers of the exposed cladding portions were heated to fuse them together, and while monitoring the quantities of the released light, the heating and elongating were carried out.

Then, when the optical coupling level of the light having the wavelength of 1.48 µm reached approximately 100% the center of the fused-elongated portion was cut into two sections. Next, one of the clamps holding the ends of the two optical fibers was rotated by 90 degrees with respect to the other clamp so as to rotate one of the two sections of optical fibers. Thereafter, the two sections of the optical fibers were joined together at the cutting plane. The joined part was heated to fuse the two sections together, and further elongation was carried out until the targeted optical coupling state was achieved. The final elongation length was 35 mm.

Figure 9:
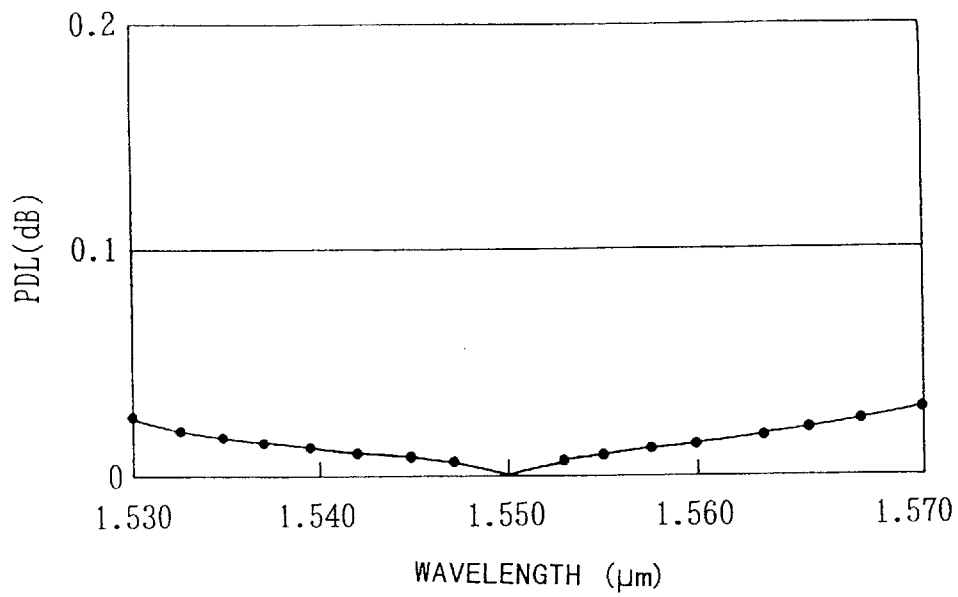
FIG. 9 is a graph showing the PDL characteristics of an optical-fiber coupler obtained in accordance with an example of the present invention.

FIG. 9 shows PDL characteristics of an optical-fiber coupler obtained in accordance with this example. As shown in the figure, the maximum value of the PDL in the wavelength range of 1.55±0.001 µm was 0.01 dB, which was extremely low.

The reason why the PDL of the optical-fiber coupler did not absolutely become zero in this example was believed to be that when one of the clamps holding the ends of the two optical fibers was rotated by 90 degrees, there was an error in the angle, and thus the twist at the fused-elongated portion was not exactly 90 degrees.

Comparative Example 1

A WDM (wavelength-division-multiplexing) optical-fiber coupler for 1.48/1.55 µm was manufactured in accordance with a conventional process.

That is to say, in a manner similar to the above Example 1, first, two single-mode optical fibers were provided, and a part of the coating layer of each of the optical fibers was removed, then the optical fibers were placed in a manufacturing machine for an optical-fiber coupler, and the exposed claddings were brought into contact with each other.

Subsequently, the approximate centers of the exposed cladding portions were heated to fuse them together, and while monitoring the quantities of the released light, the heating and elongating were carried out until a targeted optical coupling state was achieved. The final elongation length was 35 mm.

Figure 10:
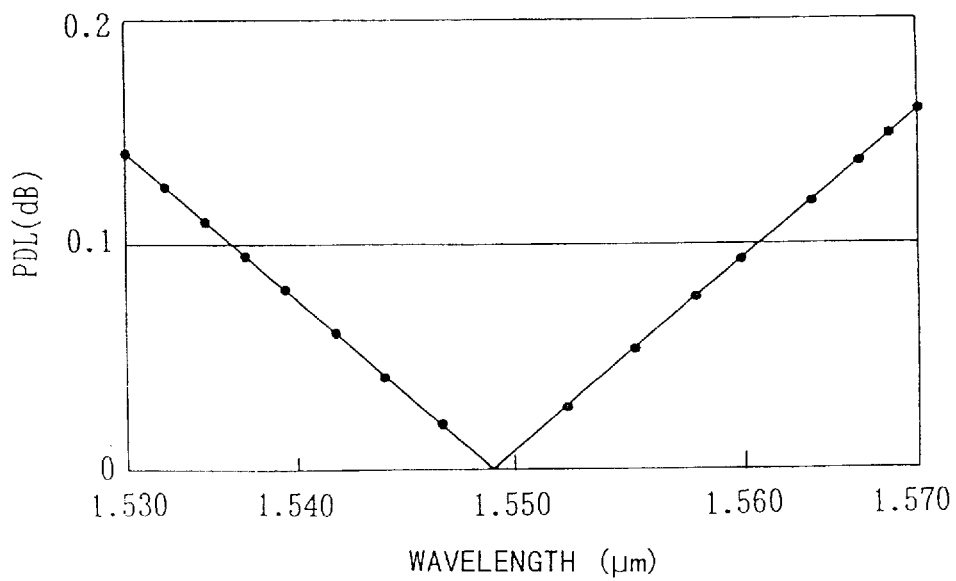
FIG. 10 is a graph showing the PDL characteristics of an optical-fiber coupler obtained in accordance with a comparative example.
Figure 11:
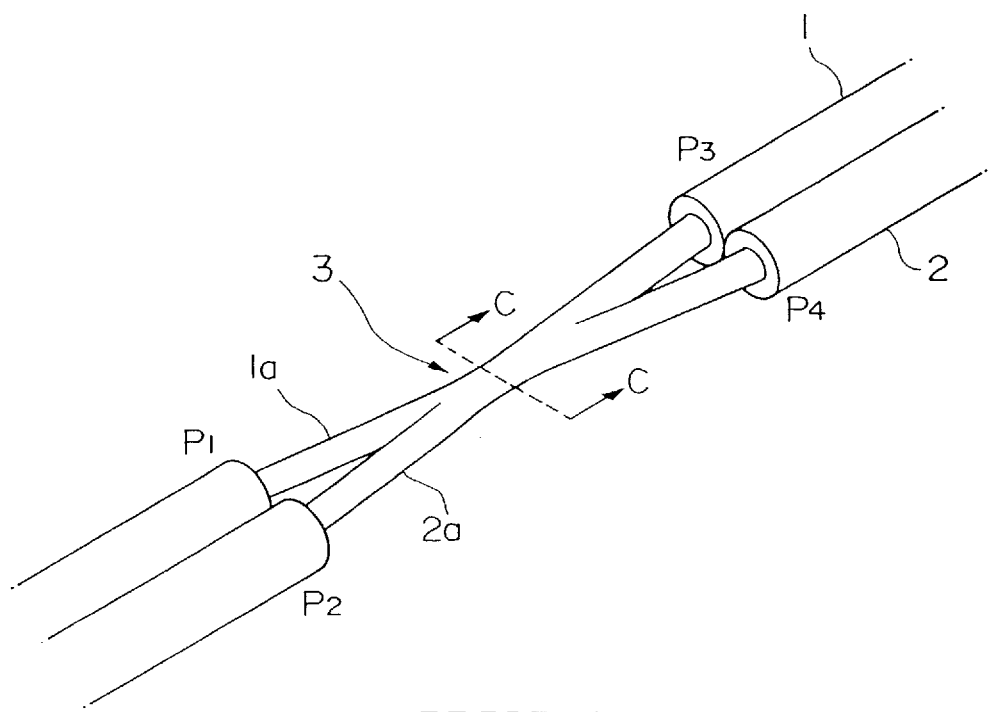
FIG. 11 is a perspective view showing an example of a conventional optical-fiber coupler.

FIG. 10 shows PDL characteristics of an optical-fiber coupler obtained in accordance with this comparative example. As shown in the figure, the maximum value of the PDL in the wavelength range of 1.55±0.001 µm was 0.09 db, which was high.

What is claimed is:

1. An optical-fiber coupler formed by disposing two single-mode optical fibers in parallel, and fusing and elongating the optical fibers at one position in the longitudinal extent of the optical fibers so as to form a fused-elongated portion having an optical coupling part, the optical-fiber coupler being characterized in that with respect to the direction of a line on a plane orthogonally intersecting the longitudinal direction of the optical fibers, said line linking the centers of the two optical fibers, the direction of such a line on a plane at one end of the optical coupling part of the fused-elongated portion makes an angle in the range of 90±10 degrees with the direction of such a line on a plane at the other end of the optical coupling part.

2. A process for manufacturing an optical-fiber coupler by disposing two single-mode optical fibers in parallel, and heating to fuse and elongate the optical fibers at one position in the longitudinal extent of the optical fibers so as to form a fused-elongated portion having an optical coupling part, the process being characterized by comprising the step of giving a twist of the optical fibers at the optical coupling part of the fused-elongated portion in the course of the heating step, whereby with respect to the direction of a line on a plane orthogonally intersecting the longitudinal direction of the optical fibers, said line linking the centers of the two optical fibers, the direction of such a line on a plane at one end of the optical coupling part of the fused-elongated portion makes an angle in the range of 90±10 degrees with the direction of such a line on a plane at the other end of the optical coupling part.

3. A process for manufacturing an optical-fiber coupler by disposing two single-mode optical fibers in parallel, and heating to fuse and elongate the optical fibers at one position in the longitudinal extent of the optical fibers so as to form a fused-elongated portion having an optical coupling part, the process being characterized by comprising the step of imparting a twist to the optical fibers before the heating step, whereby with respect to the direction of a line on a plane orthogonally intersecting the longitudinal direction of the optical fibers, said line linking the centers of the two optical fibers, the direction of such a line on a plane at one end of the optical coupling part of the fused-elongated portion makes an angle in the range of 90±10 degrees with the direction of such a line on a plane at the other end of the optical coupling part.

4. A process for manufacturing an optical-fiber coupler by disposing two single-mode optical fibers in parallel, and heating to fuse and elongate the optical fibers at one position in the longitudinal extent of the optical fibers so as to form a fused-elongated portion having an optical coupling part, the process being characterized by comprising the steps of cutting the optical coupling part of the fused-elongated portion into two sections in the course of the heating step, rotating one section around a central axis perpendicular to the cutting plane, joining the two sections together at the cutting plane, and further heating to fuse and elongate the fused-elongated portion.

* * * * *

UNITED STATES PATENT AND TRADEMARK OFFICE
CERTIFICATE OF CORRECTION

PATENT NO. : 5,848,208
DATED : December 8, 1998
INVENTOR(S) : Suzuki et al.

It is certified that error appears in the above-indentified patent and that said Letters Patent is hereby corrected as shown below:

Column 1, Line 22, delete "indicated" and insert --indicate--.

Column 1, Line 27, delete "manned" and insert --manner--.

Column 3, Line 29, delete "arid" and insert --and--.

Column 5, Line 26, after "optical-fiber", insert --coupler--.

Column 8, Line 16, delete "While" and insert --while--.

Column 13, Line 41, delete "Having" and insert --having--.

Signed and Sealed this

Thirteenth Day of April, 1999

Attest:

Q. TODD DICKINSON

Attesting Officer

Acting Commissioner of Patents and Trademarks